(12) United States Patent
Wang

(10) Patent No.: US 9,195,929 B2
(45) Date of Patent: Nov. 24, 2015

(54) CHIP CARD ASSEMBLING STRUCTURE AND METHOD THEREOF

(71) Applicant: A-MEN TECHNOLOGY CORPORATION, New Taipei (TW)

(72) Inventor: Pen-Lo Wang, New Taipei (TW)

(73) Assignee: A-Men Technology Corporation, New Taipei (TW)

( * ) Notice: Subject to any disclaimer, the term of this patent is extended or adjusted under 35 U.S.C. 154(b) by 127 days.

(21) Appl. No.: 13/958,609

(22) Filed: Aug. 5, 2013

(65) Prior Publication Data

US 2015/0034232 A1    Feb. 5, 2015

(51) Int. Cl.
| | |
|---|---|
| *B29C 65/50* | (2006.01) |
| *B32B 37/00* | (2006.01) |
| *B32B 37/02* | (2006.01) |
| *B32B 43/00* | (2006.01) |
| *G06K 19/077* | (2006.01) |
| *H04B 1/3816* | (2015.01) |

(52) U.S. Cl.
CPC ........ *G06K 19/07739* (2013.01); *H04B 1/3816* (2013.01)

(58) Field of Classification Search
CPC ............. G06K 19/0772; G06K 19/07722; G06K 19/07739; B32B 37/02; B32B 37/12; B32B 38/10; B32B 38/1825; B32B 38/1833; B32B 38/1841; B32B 2307/00; B29C 63/02; B29C 65/004; B29C 65/48; B29C 65/50; B29C 65/5042
USPC .......................... 156/152, 230, 241, 247, 249
See application file for complete search history.

(56) References Cited

U.S. PATENT DOCUMENTS

| | | | | |
|---|---|---|---|---|
| 4,298,120 A * | 11/1981 | Kaneko et al. | ................. | 206/714 |
| 4,394,844 A * | 7/1983 | Wood et al. | .................... | 118/260 |
| 4,472,218 A * | 9/1984 | Avedissian et al. | ............. | 156/64 |
| 4,725,924 A * | 2/1988 | Juan | .............................. | 361/751 |
| 4,737,395 A * | 4/1988 | Mabuchi et al. | ............... | 428/138 |
| 4,749,982 A * | 6/1988 | Rikuna et al. | ............... | 340/146.2 |
| 4,773,955 A * | 9/1988 | Mabuchi et al. | ............... | 156/257 |
| 4,951,119 A * | 8/1990 | Yonemochi et al. | .......... | 257/666 |
| 4,996,411 A * | 2/1991 | Rebjock | ........................ | 235/488 |
| 5,034,083 A * | 7/1991 | Campanelli et al. | ........ | 156/273.5 |
| 5,048,179 A * | 9/1991 | Shindo et al. | .................... | 29/840 |
| 6,073,334 A * | 6/2000 | Asai et al. | ........................ | 29/513 |
| 6,188,580 B1 * | 2/2001 | Huber et al. | ................... | 361/737 |
| 6,338,980 B1 * | 1/2002 | Satoh | ............................. | 438/106 |
| 6,364,567 B1 * | 4/2002 | Asai et al. | ...................... | 403/292 |
| 6,413,798 B2 * | 7/2002 | Asada | ............................ | 438/108 |
| 6,421,246 B1 * | 7/2002 | Schremmer | ................... | 361/737 |
| 6,478,919 B1 * | 11/2002 | Kawada et al. | ................ | 156/249 |
| 6,660,557 B2 * | 12/2003 | Usami | ............................ | 438/106 |

(Continued)

*Primary Examiner* — Sing P Chan
(74) *Attorney, Agent, or Firm* — Leong C. Lei

(57) ABSTRACT

Disclosed are a chip card assembling structure and a method thereof, including at least one base plate, at least one fixing element having a side forming a fixing trough corresponding to the base plate, at least one adhesive film disposed on one side of the fixing element to cover the fixing trough, and at least one thin-film chip received in the fixing trough and bonded to the adhesive film. To use the present invention, the adhesive film, together with the thin-film chip, is lifted and the base plate is placed into the fixing trough, following setting the adhesive film and the thin-film chip back to have the thin-film chip coupled to the base plate. Then, the adhesive film is lifted to remove the coupled thin-film chip and base plate, so that the relative position between the thin-film chip and the base plate is precise and correct.

5 Claims, 8 Drawing Sheets

(56) References Cited

U.S. PATENT DOCUMENTS

| | | | |
|---|---|---|---|
| 6,683,376 B2* | 1/2004 | Sawada et al. | 257/692 |
| 6,687,966 B2* | 2/2004 | Asai et al. | 29/243.5 |
| 6,852,608 B2* | 2/2005 | Kitamura et al. | 438/464 |
| 6,894,373 B2* | 5/2005 | Ueda et al. | 257/668 |
| 6,913,985 B2* | 7/2005 | Ogihara et al. | 438/462 |
| 6,924,547 B2* | 8/2005 | Kanemoto et al. | 257/666 |
| 6,974,724 B2* | 12/2005 | Hyvonen et al. | 438/107 |
| 6,985,363 B2* | 1/2006 | Yagi et al. | 361/760 |
| 7,056,769 B2* | 6/2006 | Usami | 438/125 |
| 7,351,645 B2* | 4/2008 | Ohashi et al. | 438/465 |
| 7,413,965 B2* | 8/2008 | Ishiwata et al. | 438/464 |
| 7,452,786 B2* | 11/2008 | Dozen et al. | 438/458 |
| 7,459,341 B2* | 12/2008 | Usami | 438/107 |
| 7,460,704 B2* | 12/2008 | Tischner et al. | 382/152 |
| 7,520,309 B2* | 4/2009 | Priewasser | 156/382 |
| 7,629,660 B2* | 12/2009 | Bauer et al. | 257/433 |
| 7,785,533 B2* | 8/2010 | Fujita et al. | 422/400 |
| 7,811,863 B1* | 10/2010 | Lin et al. | 438/122 |
| 7,840,017 B2* | 11/2010 | Isetani et al. | 381/152 |
| 7,875,501 B2* | 1/2011 | Tanaka et al. | 438/113 |
| 7,939,385 B2* | 5/2011 | Dozen et al. | 438/149 |
| 7,993,983 B1* | 8/2011 | Lin | 438/127 |
| 8,009,047 B2* | 8/2011 | Kanda et al. | 340/572.1 |
| 8,110,058 B2* | 2/2012 | Kaneshima et al. | 156/228 |
| 8,119,236 B2* | 2/2012 | Kamiya et al. | 428/343 |
| 8,181,880 B2* | 5/2012 | Kwon et al. | 235/492 |
| 8,182,649 B2* | 5/2012 | Watanabe et al. | 156/707 |
| 8,212,345 B2* | 7/2012 | Tanaka et al. | 257/678 |
| 8,281,838 B2* | 10/2012 | Kaneshima et al. | 156/494 |
| 8,608,080 B2* | 12/2013 | Finn | 235/492 |
| 8,617,928 B2* | 12/2013 | Kamiya et al. | 438/113 |
| 8,878,116 B2* | 11/2014 | Itonaga | 250/208.1 |
| 8,955,759 B2* | 2/2015 | Finn | 235/493 |
| 8,956,918 B2* | 2/2015 | Palm | 438/121 |
| 2002/0016020 A1* | 2/2002 | Usami | 438/106 |
| 2002/0030285 A1* | 3/2002 | Sawada et al. | 257/782 |
| 2002/0038584 A1* | 4/2002 | Asai et al. | 81/418 |
| 2003/0036249 A1* | 2/2003 | Bauer et al. | 438/460 |
| 2003/0218868 A1* | 11/2003 | Chiu | 361/729 |
| 2003/0227075 A1* | 12/2003 | Kanemoto et al. | 257/666 |
| 2004/0048419 A1* | 3/2004 | Kitamura et al. | 438/113 |
| 2004/0063243 A1* | 4/2004 | Usami | 438/106 |
| 2004/0090829 A1* | 5/2004 | Miura et al. | 365/200 |
| 2004/0104469 A1* | 6/2004 | Yagi et al. | 257/723 |
| 2004/0259331 A1* | 12/2004 | Ogihara et al. | 438/462 |
| 2005/0062135 A1* | 3/2005 | Tase et al. | 257/620 |
| 2005/0245001 A1* | 11/2005 | Hyvonen et al. | 438/107 |
| 2005/0269717 A1* | 12/2005 | Ohashi et al. | 257/783 |
| 2005/0287846 A1* | 12/2005 | Dozen et al. | 439/85 |
| 2006/0115989 A1* | 6/2006 | Ishiwata et al. | 438/706 |
| 2006/0189040 A1* | 8/2006 | Usami | 438/125 |
| 2006/0243620 A1* | 11/2006 | Odashima et al. | 206/405 |
| 2006/0266718 A1* | 11/2006 | Tischner et al. | 211/41.18 |
| 2006/0273420 A1* | 12/2006 | Bauer et al. | 257/432 |
| 2007/0018446 A1* | 1/2007 | Isetani et al. | 283/72 |
| 2007/0026640 A1* | 2/2007 | Priewasser | 438/460 |
| 2007/0048179 A1* | 3/2007 | Fujita et al. | 422/57 |
| 2007/0181245 A1* | 8/2007 | Kaneshima et al. | 156/229 |
| 2007/0285543 A1* | 12/2007 | Uchida | 348/294 |
| 2008/0057253 A1* | 3/2008 | Sasaki et al. | 428/43 |
| 2008/0057270 A1* | 3/2008 | Miki et al. | 428/131 |
| 2008/0182095 A1* | 7/2008 | Asai et al. | 428/311.11 |
| 2009/0050964 A1* | 2/2009 | Dozen et al. | 257/347 |
| 2009/0056981 A1* | 3/2009 | Maeda et al. | 174/254 |
| 2009/0315320 A1* | 12/2009 | Finn | 283/107 |
| 2010/0028687 A1* | 2/2010 | Kamiya et al. | 428/413 |
| 2010/0029059 A1* | 2/2010 | Matsumura et al. | 438/464 |
| 2010/0029060 A1* | 2/2010 | Kamiya et al. | 438/464 |
| 2010/0029061 A1* | 2/2010 | Kamiya et al. | 438/464 |
| 2010/0122757 A1* | 5/2010 | Lionetti et al. | 152/152.1 |
| 2010/0289283 A1* | 11/2010 | Watanabe et al. | 294/64.1 |
| 2010/0314894 A1* | 12/2010 | Watanabe et al. | 294/64.1 |
| 2011/0053346 A1* | 3/2011 | Matsumura et al. | 438/458 |
| 2011/0104873 A1* | 5/2011 | Kamiya et al. | 438/464 |
| 2011/0217501 A1* | 9/2011 | Shishido et al. | 428/41.8 |
| 2011/0256666 A1* | 10/2011 | Sugo et al. | 438/113 |
| 2011/0281509 A1* | 11/2011 | Tanaka et al. | 451/388 |
| 2012/0070960 A1* | 3/2012 | Murata et al. | 438/464 |
| 2012/0097338 A1* | 4/2012 | Kaneshima et al. | 156/494 |
| 2012/0104102 A1* | 5/2012 | Rancien et al. | 235/488 |
| 2012/0217606 A1* | 8/2012 | Itonaga | 257/443 |
| 2013/0181037 A1* | 7/2013 | Nagai et al. | 228/103 |
| 2013/0330910 A1* | 12/2013 | Tanaka et al. | 438/462 |
| 2014/0060722 A1* | 3/2014 | Finn | 156/73.1 |
| 2014/0175070 A1* | 6/2014 | Ohura et al. | 219/121.69 |
| 2014/0175624 A1* | 6/2014 | Palm | 257/666 |

* cited by examiner

CHIP CARD ASSEMBLING STRUCTURE AND METHOD THEREOF

(a) TECHNICAL FIELD OF THE INVENTION

The present invention generally relates to a chip card, and more particularly to a chip card assembling structure that allows unconstrained application and reduces manufacture cost and a method thereof.

(b) DESCRIPTION OF THE PRIOR ART

A conventional chip card generally comprises a carrier plate and a chip module that are manufactured separately. In a manufacturing process, a recess is first formed in one side of the carrier plate and then, the chip module is fit into or embedded in the recess to complete the manufacture. This process is complicated and time-consuming.

The chip cards that are currently available in the market are divided into three types, including a regular SIM card, a micro SIM card, and a nano SIM card, of which the sizes and dimensions are different. In manufacturing a conventional chip card, each time a specific size of the carrier plate and chip module is manufactured and then assembled individually, so that the manufacture cost is high. Further, the application or use of the conventional chip cards is constrained by the size and dimension thereof. In addition, inventory cost is also high.

It is thus a challenge for the manufacturers of the field and the present inventor to overcome the above-discussed problems and drawbacks.

SUMMARY OF THE INVENTION

In view of the above problems, through intense research and study of related information, as well as repeated trials and improvements, an invention related to a chip card assembling structure that allows unconstrained application and reduces manufacture cost and a method thereof are accomplished.

The primary object of the present invention is to use with various sizes and specifications.

Another object of the present invention is to reduce the cost required for manufacture.

To achieve the above objects, the present invention comprises at least a base plate and at least a fixing element. The fixing element has at least a side forming at least a fixing trough corresponding to the base plate. At least one adhesive film is disposed on one side of the fixing element to cover the fixing trough. At least one thin-film chip received in the fixing trough and bonded to the adhesive film. To use the present invention, the adhesive film is lifted to lift up the thin-film chip. The base plate is placed into the fixing trough to have the base plate fixed. The adhesive film is set back to have the thin-film chip move toward the fixing trough so that the thin-film chip can be coupled to the base plate. The adhesive film is lifted again to remove the coupled thin-film chip and base plate, so that the position where the thin-film chip is set is precise and correct. With the above-described technique, the problems that the application of a conventional film-attached chip card is constrained and the manufacture cost is relatively high can be overcome to achieve a practical advantage of unconstrained application and saving of manufacture cost.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
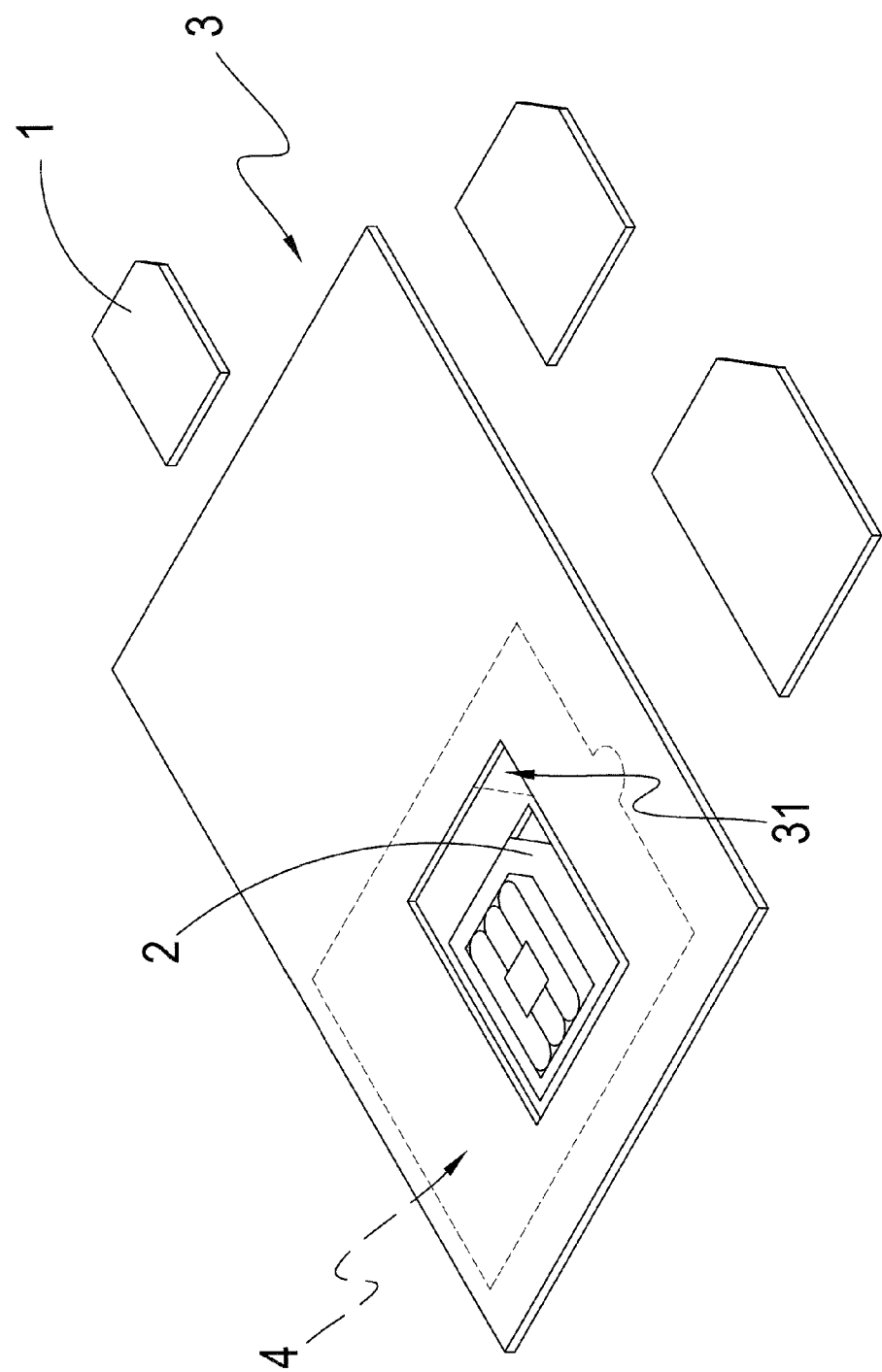
FIG. 1 is a perspective view illustrating a preferred embodiment of the present invention.
Figure 2:
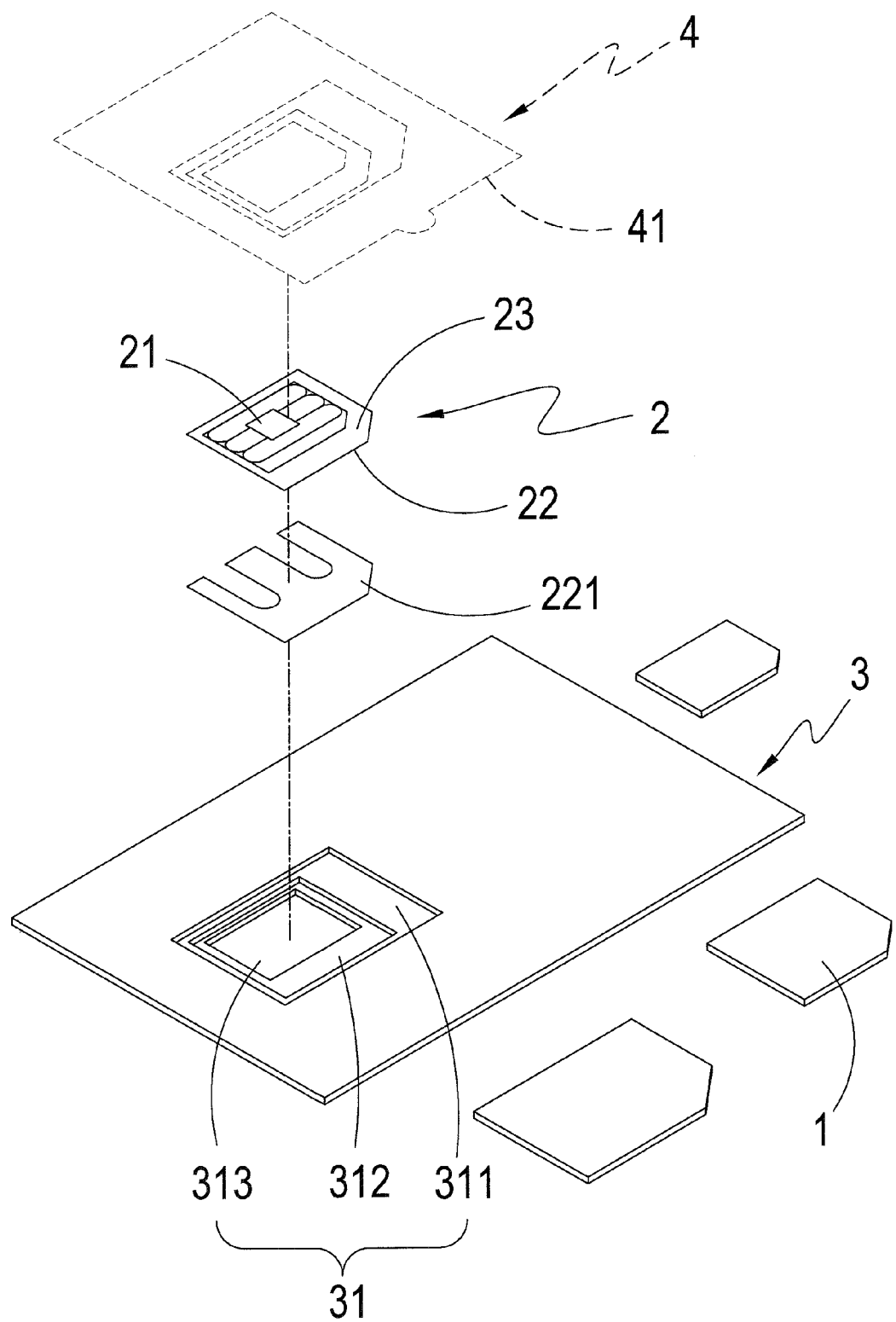
FIG. 2 is an exploded view of the preferred embodiment of the present invention.
Figure 3:
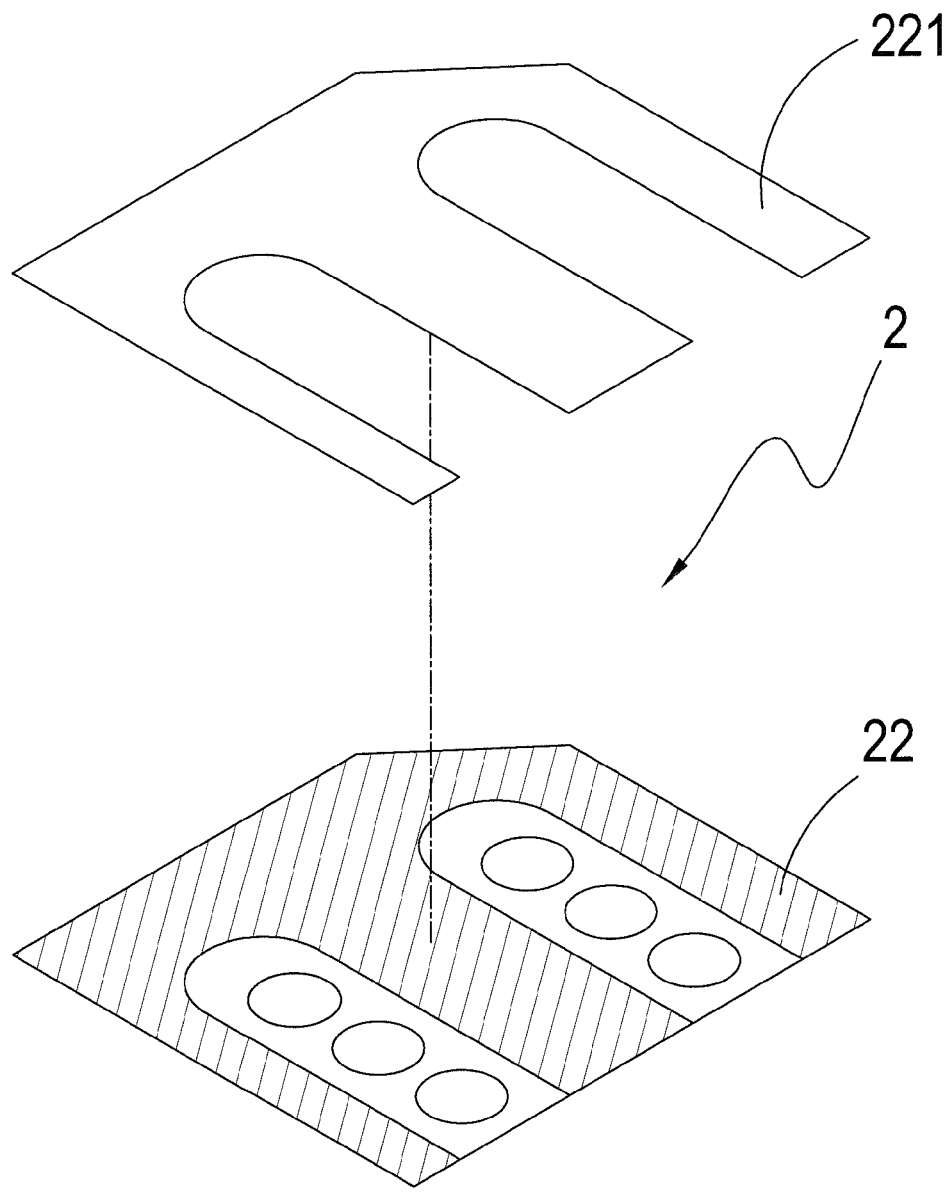
FIG. 3 is a perspective view showing a thin-film chip according to the preferred embodiment of the present invention.
Figure 4:
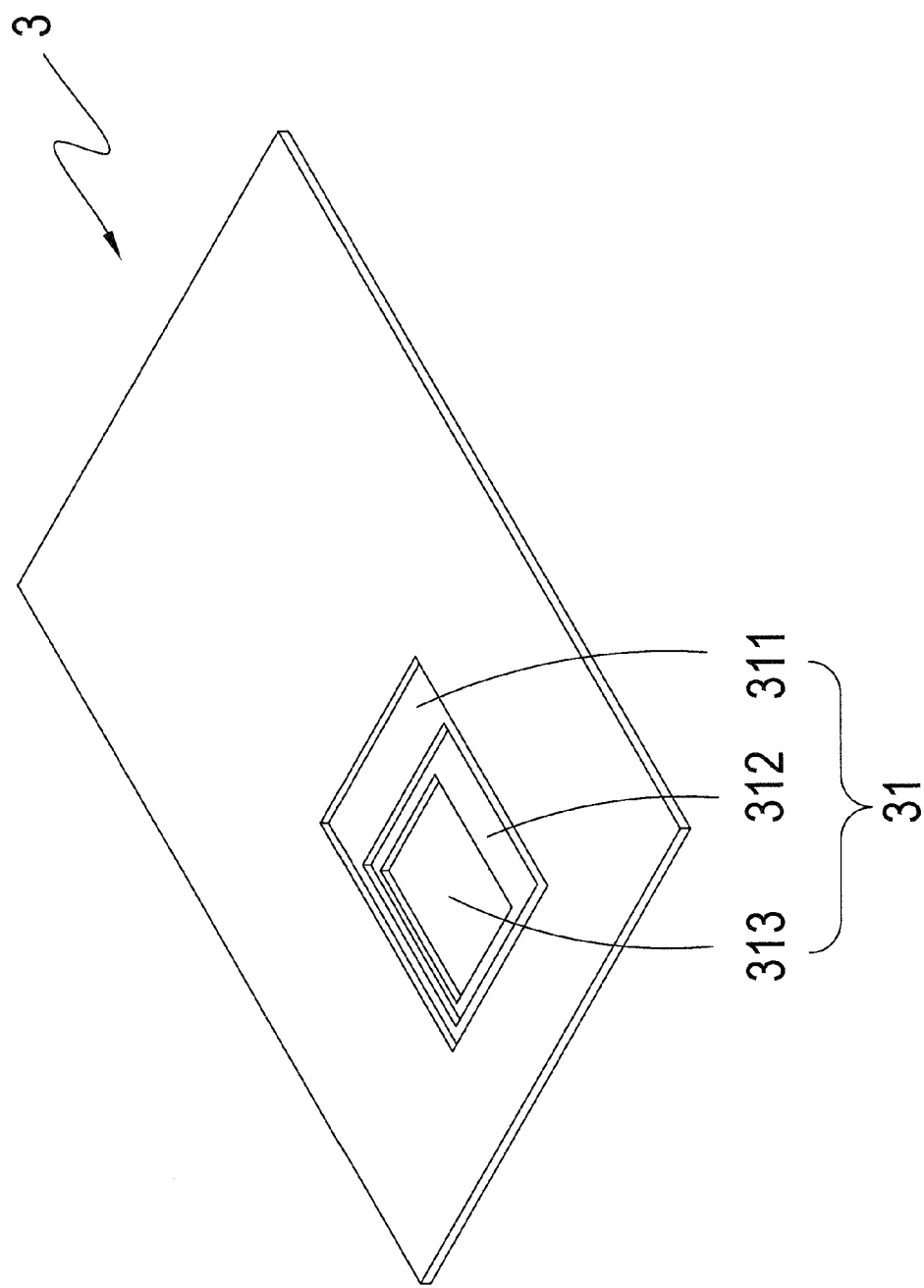
FIG. 4 is a schematic view showing a fixing element according to the preferred embodiment of the present invention.
Figure 5:
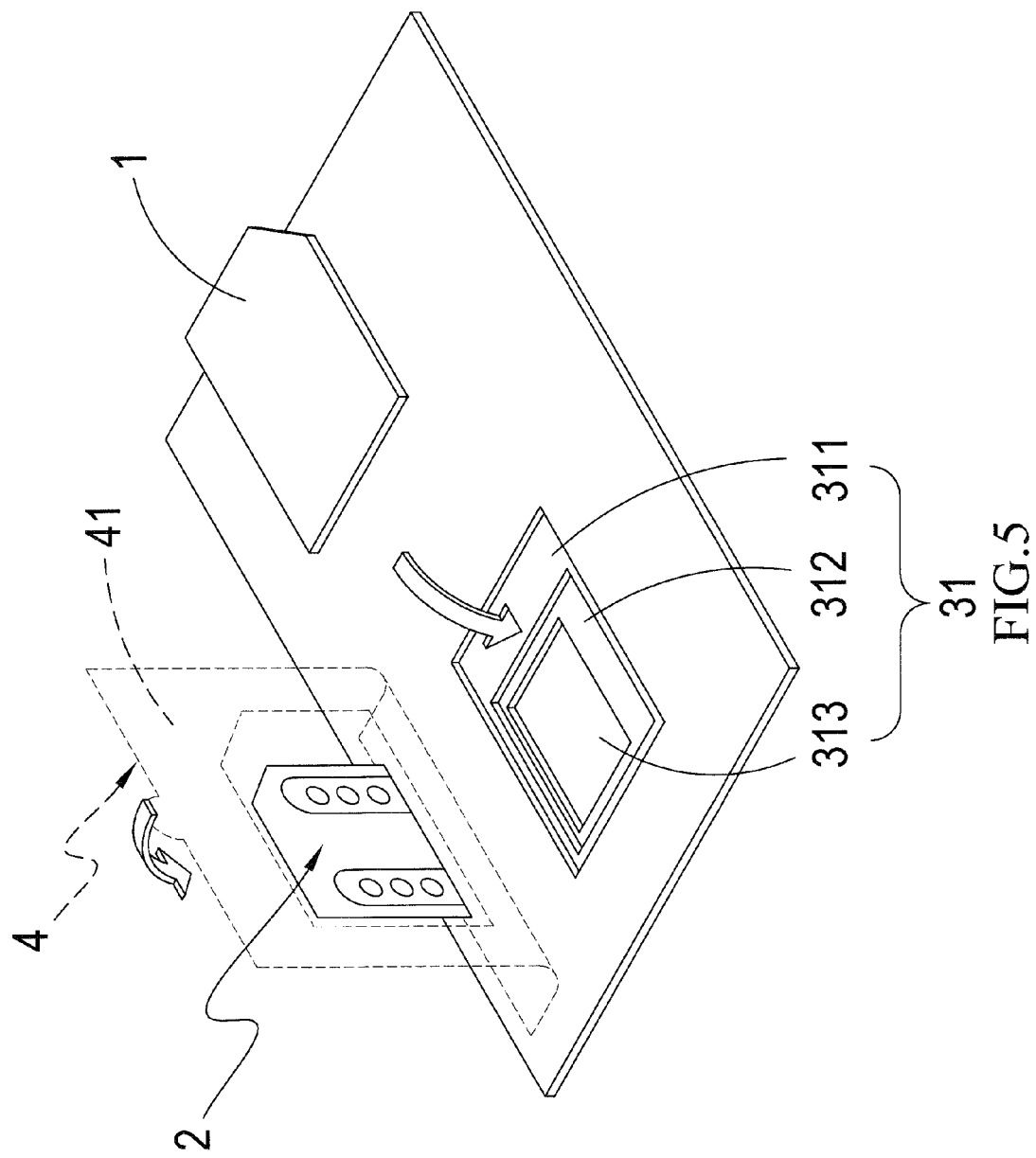
FIG. 5 is a schematic view illustrating assembling of the preferred embodiment of the present invention.
Figure 6:
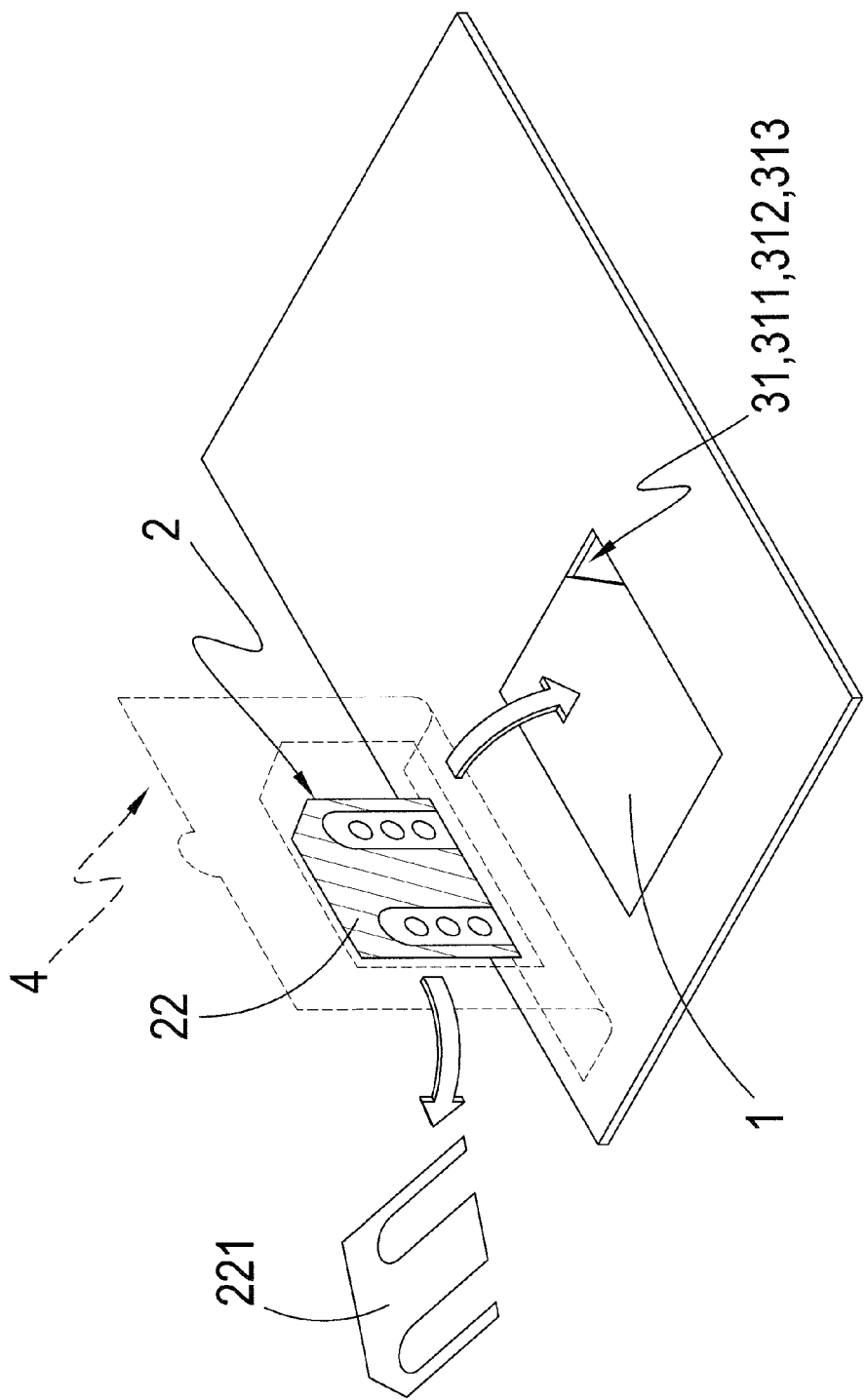
FIG. 6 is another schematic view illustrating assembling of the preferred embodiment of the present invention.
Figure 7:
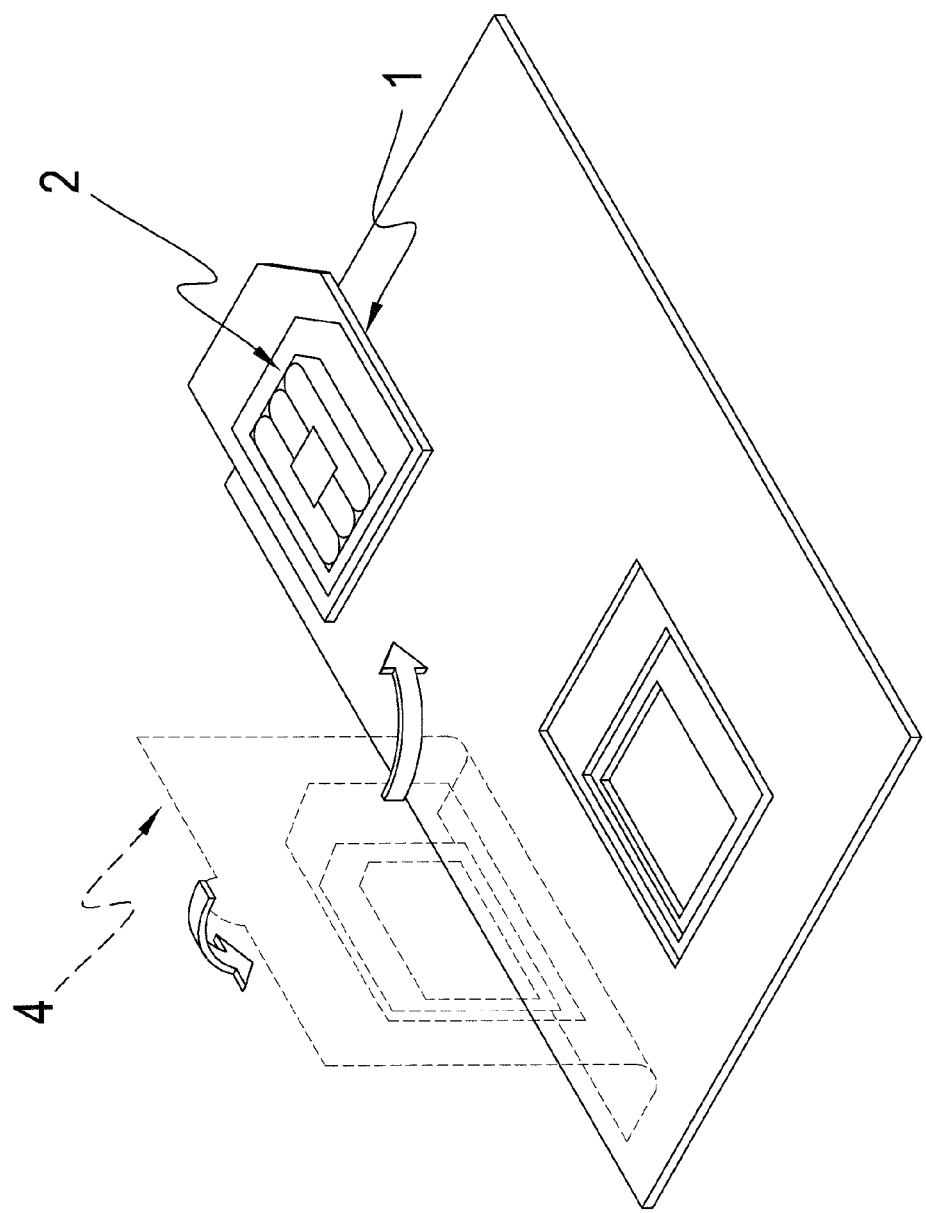
FIG. 7 is a further schematic view illustrating assembling of the preferred embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-4, which are respectively a perspective view and an exploded view of a preferred embodiment of the present invention, a schematic view of a thin-film chip of the preferred embodiment of the present invention, a schematic view of a fixing element of the preferred embodiment of the present invention, the drawings clearly show that the present invention comprises at least one base plate 1, at least one fixing element 3, at least one adhesive film 4, and at least one thin-film chip 2. In the instant embodiment, explanation will be given with reference to three different sizes specified for a regular SIM card, a micro SIM card, and a nano SIM card. The fixing element 3 comprises, formed in at least one side thereof, at least one fixing trough 31 corresponding to the base plate 1. The fixing trough 31 is divided into a first fixing trough 311 (of which the size corresponds to that of a regular SIM card), a second fixing trough 312 (of which the size corresponds to that of a micro SIM), and a third fixing trough 313 (of which the size corresponds to that of a nano SIM card). Further, trough bottoms of the first fixing trough 311, the second fixing trough 312, and the third fixing trough 313 are arranged to have different distances from a side wall of the base plate 1. The adhesive film 4 is set on one side of the fixing element 3 to cover the fixing trough 31. The adhesive film 4 has a side that is adjacent to the fixing element 3 and forms at least one sticky portion 41. The sticky portion 41 is repeatedly attachable. The thin-film chip 2 is set in the fixing trough 31 and is bonded to the adhesive film 4. The thin-film chip 2 has a side that is adjacent to the adhesive film 4 and comprises a contact interface assembly 21 and an opposite side forming at least one coupling section 22 for coupling to the base plate 1. The coupling section 22 comprises at least one separator sheet 221 mounted thereto. The thin-film chip 2 comprises at least one dividable section 23 that corresponds to the base plate 1 and is detachable. The dividable section 23 has an outer perimeter having a size corresponding to the micro SIM. The dividable section 23 has an inner perimeter having a size corresponding to the nano SIM card. Further, the above description is given to only one possible configuration of the present invention, and other configurations are also available.

Referring to FIGS. 1-8, which are respectively a perspective view and an exploded view of a preferred embodiment of the present invention, a schematic view of a thin-film chip of the preferred embodiment of the present invention, a schematic view of a fixing element of the preferred embodiment of the present invention, three schematic view illustrating assembling of the preferred embodiment of the present invention, and a schematic view illustrating disassembling of the preferred embodiment of the present invention, these drawings clearly show that to use the present invention, the adhesive film 4 is first partially peeled off to expose the fixing trough 31. The adhesive film 4 uses the sticky portion 41 to lift the thin-film chip 2 so as to remove the thin-film chip 2 out of the fixing trough 31. The separator sheet 221 is then peeled off to expose the coupling section 22 and the base plate 1 is placed and fixed in one of the first fixing trough 311, the second fixing trough 312, and the third fixing trough 313 according to the size thereof. The adhesive film 4 is bonded back to have the coupling section 22 of the thin-film chip 2 coupled to the base plate 1. The adhesive film 4 is partially peeled off again to remove the coupled thin-film chip 2 and base plate 1. When the size of the base plate 1 is that of a regular SIM card or a micro SIM card, the assembling of the chip card is completed according to the present invention.

Figure 8:
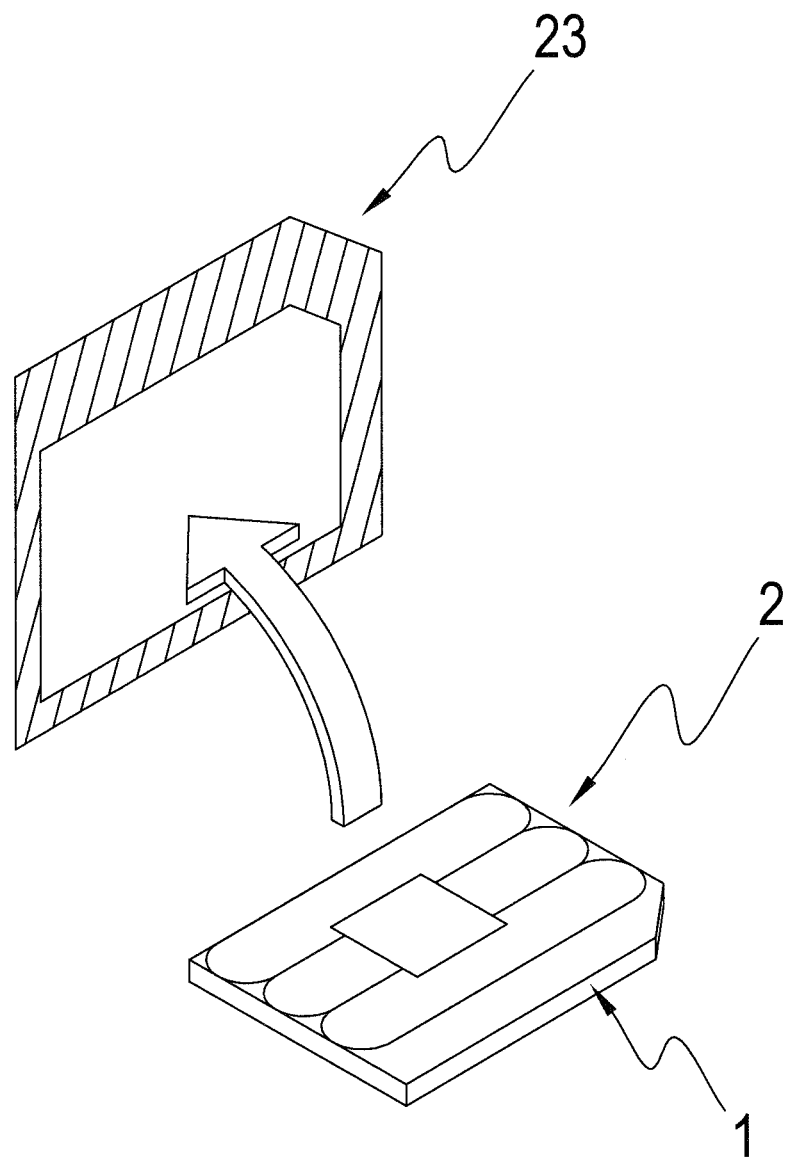
FIG. 8 is a schematic view illustrating disassembling of the preferred embodiment of the present invention.

Further, when the base plate 1 has a size that is the size of a nano SIM card, the dividable section 23 is detached and removed from the thin-film chip 2 to complete the assembling of the chip card according to the present invention (as shown in FIG. 8).

Thus, the chip card assembling structure and the method thereof according to the present invention provide the following features that improve the known techniques:

(1) The collaborative arrangement of the base plate 1 and the adhesive film 4 and that of the thin-film chip 2 and the base plate 1 provide the availability for manufacture of different sizes, specifications, and individuals so that the present invention may achieve a practical advantage of unconstrained application and reduction of manufacture cost.

(2) The detachability of the dividable section 23 from the thin-film chip 2 provides the availability for manufacture of different sizes, specifications, and individuals so that the present invention may achieve a practical advantage of unconstrained application and reduction of manufacture cost.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method of forming a chip card assembly including steps of:
    providing a fixing element with a fixing trough;
    an adhesive film affixed to a surface of the fixing element covering the fixing trough;
    wherein said thin film chip is further affixed to the adhesive film;
    partially peeling off said adhesive film from the fixing element to expose said fixing trough and lifting said thin film chip;
    providing a base plate and disposing said base plate in said fixing trough;
    re-bonding the adhesive film onto the fixing element to couple said thin film chip to said base plate to form a chip card assembly; and
    re-peeling said adhesive film to remove said chip card assembly from said fixing trough.

2. The method of forming a chip card assembly as claimed in claim 1, wherein said thin-film chip has a side that is adjacent to said adhesive film and comprises a contact interface assembly and an opposite side that comprises at least one coupling section for coupling with said base plate, said coupling section comprising at least one separator sheet.

3. The method of forming a chip card assembly as claimed in claim 1, wherein said thin-film chip comprises at least one dividable section that corresponds to said base plate and is detachable.

4. The method of forming a chip card assembly as claimed in claim 1, wherein said fixing trough is divided into a first fixing trough, a second fixing trough, and a third fixing trough, said first fixing trough, said second fixing trough, and said third fixing trough having trough bottoms that are at different distances from a side of said base plate.

5. The method of forming a chip card assembly as claimed in claim 1, wherein said adhesive film has a side that is adjacent to said fixing element and comprises at least one sticky portion, said sticky portion being repeatedly attachable.

* * * * *